United States Patent

Fukuda et al.

[11] Patent Number: 5,958,552
[45] Date of Patent: Sep. 28, 1999

[54] LAMINATED FILM

[75] Inventors: Masayuki Fukuda; Hiroshi Tomita, both of Sagamihara, Japan

[73] Assignee: Teijin Limited, Osaka, Japan

[21] Appl. No.: 08/606,971

[22] Filed: Feb. 26, 1996

[51] Int. Cl.$^6$ .......................... B32B 27/08; B32B 27/18; B32B 27/36

[52] U.S. Cl. ...................... 428/141; 428/195; 428/206; 428/327; 428/480; 428/694.85; 428/694.75; 428/694.56; 528/293; 528/295; 528/300; 528/301; 525/437

[58] Field of Search ........................... 428/141, 327, 428/480, 483, 910, 914, 694 BS, 694 TS, 694.56; 528/293, 294, 295, 300, 301; 525/437

[56] References Cited

U.S. PATENT DOCUMENTS

| | | | |
|---|---|---|---|
| 4,605,591 | 8/1986 | Nose et al. | 428/332 |
| 4,699,845 | 10/1987 | Oikawa et al. | 428/480 |
| 4,869,955 | 9/1989 | Ashcraft et al. | 428/327 |
| 5,021,544 | 6/1991 | Padget et al. | 528/272 |
| 5,128,206 | 7/1992 | Fiard et al. | 428/337 |
| 5,139,867 | 8/1992 | Light | 428/327 |
| 5,164,248 | 11/1992 | Fleury et al. | 428/220 |
| 5,356,989 | 10/1994 | Tachika et al. | 524/608 |
| 5,391,429 | 2/1995 | Otani et al. | 428/327 |
| 5,407,724 | 4/1995 | Mimura et al. | 428/141 |

FOREIGN PATENT DOCUMENTS

| | | |
|---|---|---|
| 0172269 | 2/1986 | European Pat. Off. . |
| 0559244 | 9/1993 | European Pat. Off. . |
| 63-115747 | 5/1988 | Japan . |
| WO95/13188 | 5/1995 | WIPO . |

*Primary Examiner*—Vivian Chen
*Attorney, Agent, or Firm*—Sherman And Shalloway

[57] ABSTRACT

A laminated film comprising (A) an aromatic polyester film; and (B) a hydrophilic coating layer which is present on at least one side of the aromatic polyester film (A) and has a surface energy of at least 54 dyne/cm, the coating layer comprising (a) 50 to 80% by weight of a copolyester which contains a dicarboxylic acid component having a sulfonate group in an amount of 1 to 16 mol % of the total of all dicarboxylic acid components and has a secondary transition point of 20 to 90° C., (b) 10 to 30% by weight of poly (alkylene oxide) homopolymer having a number average molecular weight of 600 to 2,000, and (c) 3 to 25% by weight of fine particles having an average particle diameter of 20 to 80 nm, based on the total of components (a), (b) and (c). The above laminated film is useful as a transparency for an overhead projector and a recording paper for an ink jet printer.

17 Claims, No Drawings

LAMINATED FILM

DETAILED DESCRIPTION OF THE INVENTION

This invention relates to a laminated film. More specifically, it relates to a laminated film which comprises a hydrophilic coating layer having high surface energy and provides an excellent transparency for an overhead projector by forming on the coating layer an aqueous ink-receiving layer, for example.

A polyester film typified by a polyethylene terephthalate film has been widely used as a film for an overhead projector (to be abbreviated as OHP hereinafter). In this case, the polyester film is required to have transparency and traveling property as well as adhesion to toner. However, since the polyester film itself has no adhesion to toner, it is used after it has been subjected to a surface treatment for providing this property.

In recent years, with the spread of color OHPs, new OHP film formation techniques such as ink jet printing system have been developed. An OHP film for such ink jet system requires the formation of an ink-receiving layer thereon. Although a film layer that is porous and has excellent ink absorbing property is used as the ink-receiving layer, it has poor adhesion to a polyester base film.

JP-A-63-115747 (the term "JP-A" as used herein means an "unexamined published Japanese patent application") discloses a thermoplastic resin film laminate comprising a layer which contains a mixture of (A) a water-insoluble copolyester comprising a mixed dicarboxylic acid component containing a dicarboxylic acid having a sulfonic acid metal salt group in an amount of 0.5 to 15 mol % of the total of all dicarboxylic acid components and a glycol component and (B) a co-condensate represented by the following formula:

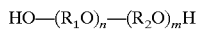

wherein n and m are each an integer of 6 to 1,200, and $R_1$ and $R_2$ are each an alkylene group having 1 to 4 carbon atoms or an arylene group, provided that $R_1$ is not the same as $R_2$ and either one of $R_1$ and $R_2$ is an alkylene group having 3 or more carbon atoms or an arylene group, the layer being formed on at least one side of the film.

This film laminate shows an antistatic property. This publication fails to disclose a laminated film having a coating film containing fine particles and takes no account of the surface energy of the coating film. Therefore, the publication suggest in no way a laminated film which is advantageously used as a transparency for OHP by forming an ink-receiving layer on a coating film, and which has excellent adhesion to the ink-receiving layer and relatively high surface energy.

An object of the present invention is to provide a novel laminated film.

Another object of the present invention is to provide a laminated film having a hydrophilic coating layer with high surface energy and excellent traveling property.

Still another object of the present invention is to provide a laminated film for use as an OHP transparency, which has high transparency and excellent adhesion to an aqueous ink-receiving layer.

A further object of the present invention is to provide a laminated film for use as recording paper, which has large hiding power and excellent adhesion to an aqueous ink-receiving layer.

A still further object of the present invention is to provide an OHP transparency comprising the above transparent laminated film of the present invention.

A still further object of the present invention is to provide recording paper comprising the above laminated film of the present invention having large hiding power.

Other objects and advantages of the present invention will be apparent from the following description.

Firstly, according to the Present invention, the above objects and advantages can be attained by a laminated film comprising (A) an aromatic polyester film; and (B) a hydrophilic layer present on at least one side of the aromatic polyester film (A) and having a surface energy of at least 54 dyne/cm, which comprises (a) 50 to 80% by weight of a copolyester containing a dicarboxylic acid component having a sulfonate group in an amount of 1 to 16 mol % of the total of all dicarboxylic acid components and having a secondary transition temperature of 20 to 90° C., (b) 10 to 30% by weight of poly(alkylene oxide) having a number average molecular weight of 600 to 2,000, and (c) 3 to 25% by weight of a fine particle having an average particle diameter of 20 to 80 nm, based on the total of components (a), (b) and (c).

The laminated film of the present invention comprises the aromatic polyester film (A) and the hydrophilic coating layer (B) as described above.

The aromatic polyester of the aromatic polyester film (A) is a polyester which comprises an aromatic dicarboxylic acid as a dicarboxylic acid component and an aliphatic diol as a diol component.

Preferred examples of the aromatic dicarboxylic acid include terephthalic acid, isophthalic acid, 2,6-naphthalene dicarboxylic acid, 4,4'-diphenyl dicarboxylic acid and the like.

Preferred examples of the aliphatic diol include ethylene glycol, 1,4-butane diol, 1,4-cyclohexane dimethanol, 1,6-hexane diol and the like.

These aromatic dicarboxylic acids and aliphatic diols may be used alone or in combination of two or more.

The aromatic polyester is preferably a polyester which contains terephthalic acid or 2,6-naphthalene dicarboxylic acid in an amount of at least 95 mol % of the total of all dicarboxylic acid components and ethylene glycol in an amount of at least 95 mol % of the total of all aliphatic diol components, particularly preferably a polyester which contains polyethylene terephthalate and polyethylene-2,6-naphthalene dicarboxylate.

The aromatic polyester preferably contains organic or inorganic fine particles as a lubricant as required to improve wind-up property in the production of a film and the traveling property of a film when used as an OHP film. Illustrative examples of the fine particles include inorganic fine particles such as calcium carbonate, calcium oxide, alumina, kaolin, silica and zinc oxide; and organic fine particles such as crosslinked acrylic resin particle, crosslinked polystyrene resin particle, melamine resin particle and crosslinked silicone resin particle. In addition to these fine particles, a colorant such as titanium oxide, barium sulfate, antistatic agent, antioxidant, lubricant, catalyst and other resins may be contained optionally as required.

The hydrophilic coating layer (B) contains a copolyester (a), poly(alkylene oxide) (b) and fine particles (c) as described above.

The copolyester (a) contains a dicarboxylic acid having a sulfonate group in an amount of 1 to 16 mol % of the total of all dicarboxylic acid components and has a secondary transition temperature of 20 to 90° C.

Illustrative examples of the dicarboxylic acid component constituting the copolyester (a) other than the dicarboxylic acid component having a sulfonate group include terephthalic acid, 2,6-naphthalene dicarboxylic acid, hexahydroterephthalic acid, 4,4'-diphenyl dicarboxylic acid, phenylindane dicarboxylic acid, adipic acid, sebacic acid, trimellitic acid, dimethylol propionic acid and the like.

Specific examples of the dicarboxylic acid component having a sulfonate group include alkali metal salts of 5-sulfoisophthalic acid and alkali metal salts of 5-sulfoterephthalic acid. Among these, alkali metal salts of 5-sulfoisophthalic acid are preferred. The alkali metal salts include salts of sodium, potassium and lithium.

The dicarboxylic acid component having a sulfonate group needs to account for 1 to 16% by weight, preferably 1.5 to 14% by weight, of the total of all dicarboxylic acid components.

Illustrative examples of the diol constituting the copolyester (a) include ethylene glycol, diethylene glycol, neopentylene glycol, 1,4-butane diol, 1,6-hexane diol, 1,4-cyclohexane dimethanol, glycerin, trimethylol propane, an adduct of alkylene oxide with bisphenol-A and the like.

Dicarboxylic acids and diols constituting the copolyester (a) may be used alone or in combination of two or more.

When the proportion of the dicarboxylic acid component having a sulfonate group contained in the copolyester (a) is less than 1 mol %, the hydrophilic property of the copolyester is insufficient and when it is more than 16 mol %, the moisture resistance of the coating film deteriorates disadvantageously.

The secondary transition point (Tg) of the copolyester (a) needs to be 20 to 90° C. When Tg is lower than 20° C., blocking is liable to occur in the film roll and when Tg is higher than 90° C., the adhesion of the film deteriorates disadvantageously.

The secondary transition point is preferably in the range of 30 to 80° C.

The poly(alkylene oxide) (b) is preferably a polymer or a copolymer of alkylene oxide having 2 to 4 carbon atoms. Illustrative examples of the poly(alkylene oxide) include poly(ethylene oxide), poly(propylene oxide), poly(ethylene oxide/propylene oxide) copolymer and the like. Among these, poly(ethylene oxide) and poly(ethylene oxide/propylene oxide)copolymer are particularly preferred.

The poly(alkylene oxide) has a number average molecular weight of 600 to 2,000.

When the number average molecular weight is less than 600, the blocking resistance of the film and the moisture resistance of the coating film deteriorate. On the other hand, when the number average molecular weight is more than 2,000, adhesion of the poly(alkylene oxide) to the ink-receiving layer deteriorates disadvantageously.

The number average molecular weight is preferably in the range of 1,000 to 1,500.

The fine particles (c) may be organic or inorganic fine particles. Illustrative examples of the fine particle include inorganic fine particles such as calcium carbonate, calcium oxide, alumina, kaolin, silica and zinc oxide; and organic fine particles such as crosslinked acrylic resin particle, crosslinked polystyrene resin particle, melamine resin particle and crosslinked silicone resin particle. Among these, organic fine particles are preferred.

The fine particle (c) has an average particle diameter of 20 to 80 nm.

When the average particle diameter is less than 20 nm, blocking is liable to occur in the film roll, while when it is more than 80 nm, the abrasion resistance of the film deteriorates disadvantageously.

The hydrophilic coating layer (B) in the present invention comprises 50 to 80% by weight of component (a), 10 to 30% by weight of component (b) and 3 to 25% by weight of component (c), preferably 60 to 80% by weight of component (a), 10 to 20% by weight of component (b) and 5 to 15% by weight of component (c), based on the total weight of components (a), (b) and (c).

When the proportion of component (a) is less than 50% by weight, the adhesion of the coating layer (B) to the polyester film is insufficient. On the other hand, when the proportion is more than 80% by weight, the adhesion of the coating layer (B) to the ink-receiving layer deteriorates disadvantageously. When the proportion of component (b) is less than 10% by weight, adhesion to the ink-receiving layer is insufficient and when it is more than 30% by weight, blocking resistance deteriorates disadvantageously. When the proportion of component (c) is less than 3% by weight, the slip property (traveling property) of the film is insufficient and when it is more than 25% by weight, abrasion resistance deteriorates disadvantageously.

Further, the hydrophilic coating layer (B) has a surface energy of at least 54 dyne/cm.

When the surface energy is less than 54 dyne/cm, the coating layer cannot achieve sufficient adhesion to the ink-receiving layer formed on the coating layer. The surface energy is preferably at least 60 dyne/cm.

The laminated film of the present invention is available in two types: one type comprising the aromatic polyester film (A) as a substrate having high transparency and the other type comprising the aromatic polyester film (A) having almost no transparency.

When the substrate (A) has high transparency, it preferably has a light transmission rate of at least 85% and a haze value of 10% or less.

In this case, the center line average surface roughness Ra of the substrate is preferably in the range of 5 to 15 nm.

According to the present invention, using the laminated film of the present invention having this type of substrate, there is also provided an OHP transparency which comprises an aromatic polyester film (A) having a light transmission rate of at least 85% and a haze value of 10% or less, a hydrophilic coating layer and an aqueous ink-receiving layer formed on the coating layer.

When the transparency of the substrate is low, the substrate (A) preferably has a light transmission rate of 20% or less and is white.

In this case, Ra of the substrate surface is in the range of 100 to 250 nm.

According to the present invention, using the laminated film of the present invention having this type of substrate, there is also provided recording paper for an ink jet printer which comprises the aromatic polyester film (A) having a light transmission rate of 20% or less and white-colored, a hydrophilic coating layer and an aqueous ink-receiving layer formed on the coating layer.

The ink-receiving layer includes a layer which contain fine particles having an average particle diameter of 10 to 30 μm, such as spherical silica, and a hydrophilic polymer such as polyvinyl alcohol, and a layer obtained from an aqueous slurry exemplified in JP-A-1-95091.

The laminated film of the present invention comprising the aromatic polyester film (A) and the hydrophilic coating layer (B) can be produced, for example, by preparing an aqueous solution containing the above components (a), (b) and (c) constituting the hydrophilic coating layer, applying the solution to a stretchable aromatic polyester film, drying and orienting the film as required. Application of the aqueous solution is preferably carried out in a clean atmosphere, that is, in the film production process- The adhesion of the hydrophilic coating layer to the polyester film is further improved by this coating.

When application of the aqueous solution to the polyester film is carried out in a normal coating step, that is, a step separate from the production step of a biaxially oriented, heat-set polyester film, dirt and dust may be adhered to the film disadvantageously.

The stretchable polyester film is an unoriented polyester film, a monoaxially oriented polyester film, or biaxially oriented polyester film. Among these, a longitudinally oriented polyester film which has been oriented monoaxially in the direction of extruding the film (longitudinal direction) is preferred.

As a method for forming a hydrophilic coating layer, any known coating method can be applied. For example, roll coating, gravure coating, roll brushing, spray coating, air knife coating, impregnation and curtain coating may be used alone or in combination. The amount of coating is preferably 0.5 to 20 g, more preferably 1 to 10 g, per 1 $m^2$ of the traveling film. The aqueous solution is preferably a water dispersion or an emulsion.

Besides the above components (a), (b) and (c), the aqueous solution may contain another resin such as melamine resin, an antistatic agent, a colorant, a surfactant, an ultraviolet absorber and the like as coating film forming components.

The solid content concentration of the aqueous solution is generally 2 to 30% by weight, preferably 2 to 10% by weight.

The stretchable polyester film coated with the aqueous solution is guided to drying and orienting steps. These treatments can be carried out under conditions whose data have been accumulated by the industry. Preferable conditions include drying at 90 to 130° C. for 2 to 10 seconds, orientation temperature of 90 to 130° C., draw rate of 3 to 5 times in a longitudinal direction and 3 to 5 times in a transverse direction, redraw rate of 1 to 3 times in a longitudinal direction if necessary, and heat-setting at 180 to 240° C. for 2 to 20 seconds.

The thickness of the polyester film (A) of the laminated film of the present invention after these treatments is preferably 50 to 150 $\mu$m, and the thickness of the hydrophilic coating layer (B) is preferably 0.02 to 1 $\mu$m.

The following examples are given to further illustrate the present invention. Property values of each example were measured in accordance with the following methods.

1. Adhesion

An aqueous slurry (solid content concentration: 45% by weight) containing 70% by weight of spherical silica (average particle diameter: 18 $\mu$m, average pore diameter: 200 Å, average pore volume: 1.5 cc/g) and 30% by weight of polyvinyl alcohol (PVA 117, manufactured by Kuraray Co. Ltd) was applied to the surface of a polyester film to achieve a 20 $\mu$m thick coating film, and dried. To the thus obtained ink-receiving layer was affixed 12.7 mm wide, 150 mm long Scotch tape (No.600, manufactured by 3M Co.) in such a manner that air did not enter between the layer and the tape. A manual load roll described in JIS 2701 (1975) was rolled over this tape to adhere the tape closely to the layer which was then cut to the width of the tape. The peeling state of the ink-receiving layer from the polyester film when the tape was stripped from the thus prepared sample was observed to evaluate adhesion as follows.

A: No peeling was observed and adhesion was good.

B: Slight peeling was observed in foreign matters.

C: Remarkable peeling was observed.

2. Friction Coefficient

Static friction coefficient was measured by laminating two films in such a manner that the front surface of one film is in touch with the rear surface of the other film and applying a load of 1 kg on the films in accordance with ASTM 1894-63, using a slipper measuring instrument manufactured by Toyo Tester Co. When the friction coefficient exceeds 0.6, the traveling property of the film is impaired.

3. Blocking Resistance

Two 50 mm wide-cut films were laminated and the resulting laminate was treated under a load of 50 kg/$cm^2$ at 40° C. and an RH of 50% for 17 hours. Thereafter, the peel strength (g/50 mm) of a portion of the laminate applied by a load was measured with a tensile tester. Blocking resistance was evaluated in terms of the value of peel strength.

good blocking resistance: peel strength $\leq$10 g/50 mm fair blocking resistance: 10 g/50 mm<peel strength$\leq$30 g/50 mm poor blocking resistance: 30 g/50 mm<peel strength 4. Surface Energy Critical surface tension $\gamma_c$ measured in accordance with W. A. Zisman: "Contact Angle, wettability and Adhesion", Am. Chem. Soc., (1964) was taken as surface energy.

5. Secondary Transition Point (Tg)

This was measured at a temperature elevation rate of 20° C./minute with Thermal Analyst Model 2000, a differential calorimeter manufactured by Du Pont.

6. Intrinsic Viscosity

The viscosity of a solution in an orthochlorophenol solvent was measured at 35° C.

7. Water Dispersibility

Coating agent was diluted with water to prepare a water dispersion containing 0.2% by weight of the coating agent and a light transmission rate of the dispersion was measured with a double beam spectrophotometer (Model 228A) manufactured by Hitachi Ltd. using a quartz cell. Based on the measurement results, water dispersibility was evaluated as follows.

good water dispersibility: light transmission rate$\geq$50% fair water dispersibility: 50%>light transmission rate$\geq$30% poor water dispersibility: 30>light transmission rate

8. Moisture Resistance

Peel strength (g/50 mm) was measured in the same manner as in the above blocking resistance evaluation except the treatment condition was changed to 60° C.×70% RH×17 hours. Moisture resistance was evaluated as follows based on the measurement results.

good moisture resistance: peel strength$\leq$10 g/50 mm fair moisture resistance: 10 g/50 mm<peel strength$\leq$30 g/50 mm poor moisture resistance: 30 g/50 mm<peel strength 9. Light Transmission Rate and Haze These were measured in accordance with ASTM 1003, using Model HR-100, a haze meter manufactured by Murakami Shikisai Gijutsu Kenkyusho.

10. Thermal Shrinkage

The shrinkage of a polyester film heat-treated at 150° C. for 30 minutes was measured at a distance between two gage marks of 30 cm.

11. Center Line Average Surface Roughness (Ra)

In accordance with JIS B0601, a chart was drawn under such conditions as a needle radius of 2 $\mu$m, a load of 30 mg, a magnification of 50,000× and a cut-off of 0.08 mm, using the SE-3FAT, a high-accuracy surface roughness meter manufactured by Kosaka Kenkyusho Co., and a portion having a measurement length L was cut out from a surface roughness curve in the direction of its center line. Center line average surface roughness (Ra: nm) Is defined as a value obtained from the following expression when the center line of this cut-out portion is taken as the X axis, the direction of longitudinal magnification is taken as the Y axis and a roughness curve is represented by Y=f(x).

$$Ra = \frac{1}{L}\int_0^L |f(x)| dx$$

Four different portions having a standard length of 1.25 mm were measured and center line average surface roughness (Ra) was obtained by averaging the four measurement values.

Comparative Example 1

A biaxially oriented film was obtained in the same manner as in Example 1 except an aqueous solution was not applied. The properties of the film are shown in Table 1.

EXAMPLES 2 to 7

Biaxially oriented firms were obtained in the same manner as in Example 1 except type and proportion of the coating were changed as shown in Table 1. The properties of these films are shown in Table 1.

TABLE 1

|  | (A) type (note 1) and proportion of copolyester (WT %) | (B) type (note 2) and proportion of poly(alkylene oxide) (WT %) | (C) proportion of fine particles (WT %) | adhesion | friction coefficient | surface energy (dyne/cm) | light transmission rate (%) | haze (%) |
|---|---|---|---|---|---|---|---|---|
| Example 1 | E 65 | F 16 | 10 | A | 0.47 | 58 | 90 | 1 |
| Example 2 | E 70 | P 11 | 10 | A | 0.43 | 55 | 87 | 1.3 |
| Example 3 | E 65 | Q 16 | 10 | A | 0.48 | 65 | 91 | 0.9 |
| Example 4 | E 70 | Q 11 | 10 | A | 0.44 | 54 | 88 | 1.2 |
| Example 5 | F 65 | P 16 | 10 | A | 0.48 | 59 | 90 | 1.1 |
| Example 6 | F 70 | P 11 | 10 | A | 0.45 | 55 | 88 | 1.2 |
| Example 7 | F 60 | P 21 | 10 | A | 0.49 | 62 | 92 | 0.9 |
| Comp. Ex. 1 | — | — | — | C | >0.6 | 46 | 90 | 1 |

EXAMPLE 1

An unoriented sheet of polyethylene terephthalate having an intrinsic viscosity of 0.64 was drawn to 3.5 times in a longitudinal direction. To this monoaxially oriented film was applied an aqueous solution containing 4% by weight, as the solid concentration, of a composition which comprises (i) 65% by weight of a copolyester (to be abbreviated as E hereinafter) (Tg=30° C.) consisting of 60 mol % of terephthalic acid, 37 mol % of isophthalic acid and 3 mol % of 5-Na sulfoisophthalatic acid, and 40 mol % of ethylene glycol, 40 mol % of neopentylene glycol and 20 mol % of an adduct of ethylene oxide (2 mols) with bisphenol-A, (ii) 16% by weight of poly(ethylene oxide) (to be abbreviated as P hereinafter) having a number average molecular weight of 1,000, (iii) 10% by weight of a crosslinked acrylic resin particle having an average particle diameter of 40 nm, and (iv) 9% by weight of polyoxyethylene nonylphenyl ether, with a roll coater. Thereafter, the longtudinally monoaxially-oriented film coated with the aqueous solution was dried, drawn to 4 times in-a transverse direction and further heat-set at 230° C. to obtain a 100 μm thick biaxially oriented film. The thickness of the coating of this film was 0.03 μm. The properties of the film are shown in Table 1.

(Note 1) type of copolyester, numerals in the parentheses indicate values in mol %.

F: 2,6-naphthalene dicarboxylic acid (20)- isophthalic acid (76) 5-potassium sulfoterephthalatic acid (4)/ ethylene glycol (50) neopentylene glycol (50) copolymer (Tg=42° C.)

(Note 2) type of poly(alkylene oxide)

Q: polypropylene oxide having a number average molecular weight of 1,200

As is evident from Table 1, the films of the present invention have excellent adhesion and traveling properties.

EXAMPLES 8 to 11

Comparative Examples 2 and 3

Biaxially oriented polyester films were obtained in the same manner as in Example 1 except that type of the copolyester (A) was changed as shown in Table 2 and copolyesters having different Tgs were used. The properties of the thus obtained films are shown in Table 2. As evident from Table 2, the films of the present invention have excellent blocking resistance, transparency and adhesion property.

TABLE 2

|  | type of (A) (note 3) | Tg of (A) (° C.) | blocking resistance | transparency (light transmission rate) (%) | adhesion | surface energy (dyne/cm) | haze (%) |
|---|---|---|---|---|---|---|---|
| Example 8 | G | 25 | fair | 90 | A | 58 | 0.9 |
| Example 9 | H | 50 | good | 90 | A | 57 | 1.1 |
| Example 10 | I | 65 | good | 89 | A | 55 | 1.1 |
| Example 11 | J | 79 | good | 87 | B | 54 | 1.5 |
| Comp. Ex. 2 | K | 15 | poor | 91 | A | 60 | 0.8 |
| Comp. Ex. 3 | L | 97 | good | 80 | C | 55 | 3.0 |

(note 3) copolymer composition of (A) (numerals indicate values in mol %)

| copolymer components | abbreviations of (A) | | | | | |
|---|---|---|---|---|---|---|
|  | G | H | I | J | K | L |
| terephtalic acid | 60 | 36 | 70 | — | 16 | 19 |
| isophthalic acid | 36 | 49 | 27 | 37 | 80 | — |
| 2,6-naphthalene dicarboxylic acid | — | 20 | — | 60 | — | 77 |
| 5-sulfoisophthalic acid | — | 4 | — | — | 4 | 4 |
| 5-Na sulfoisophthalic acid | — | — | 3 | 3 | — | — |
| 5-K sulfoterephthalic acid | 4 | — | — | — | — | — |
| ethylene glycol | 5 | 60 | 60 | 80 | — | 98 |
| diethylene glycol | 3 | 2 | — | — | 5 | — |
| 1,4-butane diol | 42 | 2 | — | — | 60 | — |
| neopentylene glycol | — | 8 | 4 | 5 | 7 | 2 |
| adduct of ethylene oxide with bisphenol-A | 50 | 28 | 36 | 15 | 28 | — |

EXAMPLES 12 to 16

Comparative Examples 4 and 5

Biaxially oriented polyester films were obtained in the same manner as in Example 1 except that the proportion of the dicarboxylic acid component having a sulfonate group of the copolyester (A) was changed as shown in Table 3. The properties of the thus obtained films are shown in Table 3. As is evident from Table 3, the coating used in the present invention has excellent water dispersibility and the films of the present invention have excellent moisture resistance.

TABLE 3

|  | proportion of carboxylic acid component of copolyester (A) (mol %) | | | water dispersibility | moisture resistance | surface energy (dyne/cm) |
|---|---|---|---|---|---|---|
|  | 5-Na sulfoisophthalic acid | terephthalic acid | isophthalic acid |  |  |  |
| Example 12 | 1 | 60 | 39 | fair | good | 56 |
| Example 13 | 1.5 | 60 | 38.5 | good | good | 56 |
| Example 14 | 8 | 60 | 32 | good | good | 60 |
| Example 15 | 14 | 60 | 26 | good | good | 62 |
| Example 16 | 16 | 60 | 24 | good | fair | 65 |
| Comp. Ex. 4 | 0 | 60 | 40 | poor | good | 54 |
| Comp. Ex. 5 | 20 | 60 | 20 | good | poor | 67 |

EXAMPLES 17 to 19

Comparative Examples 6 and 7

Biaxially oriented films were obtained in the same manner as in Example 1 except that the proportions of copolyester (A), poly(alkylene oxide) (B) and fine particles (C) were changed as shown xi Table 4. The properties of the thus obtained films are shown in Table 4. As is evident from Table 4, the films of the present invention have excellent adhesion and traveling properties.

TABLE 4

|  | copolyester (A) (WT %) | poly(alkylene oxide) (B) (WT %) | fine particles (C) (WT %) | proportion of (A) based on the total of (A), (B) and (C) (WT %) | adhesion | friction coefficient | surface energy (dyne/cm) |
|---|---|---|---|---|---|---|---|
| Example 17 | 60 | 21 | 10 | 66 | A | 0.43 | 60 |
| Example 18 | 55 | 26 | 10 | 60 | A | 0.41 | 61 |
| Example 19 | 70 | 11 | 10 | 77 | A | 0.49 | 55 |
| Comp. Ex. 6 | 40 | 41 | 10 | 44 | B | 0.68 | 67 |
| Comp. Ex. 7 | 79 | 2 | 10 | 87 | C | 0.42 | 48 |

EXAMPLES 20 and 21

Comparative Examples 8 and 9

Biaxially oriented films were obtained in the same manner as in Example 1 except that the proportions of copolyester (A), poly(alkylene oxide) (B) and fine particles (C) were changed as shown in Table 5. The properties of the thus obtained films are shown in Table 5. As is evident from Table 5, the films of the present invention have excellent adhesion and traveling properties.

TABLE 6

|  | average particle diameter of fine particles (C) (nm) | blocking resistance | transparency (light transmission rate) (%) | surface energy (dyne/cm) |
|---|---|---|---|---|
| Example 22 | 20 | fair | 90 | 58 |
| Example 23 | 80 | good | 90 | 58 |
| Comp. Ex. 10 | 10 | poor | 92 | 59 |
| Comp. Ex. 11 | 120 | good | 79 | 60 |

TABLE 5

|  | copolyester (A) (WT %) | poly(alkylene oxide) (B) (WT %) | fine particles (C) (WT %) | proportion of (A) based on the total of (A), (B) and (C) (WT %) | adhesion | friction coefficient | surface energy (dyne/cm) |
|---|---|---|---|---|---|---|---|
| Example 20 | 71 | 10 | 10 | 11 | A | 0.49 | 54 |
| Example 21 | 51 | 30 | 10 | 33 | A | 0.42 | 59 |
| Comp. Ex. 8 | 31 | 50 | 10 | 55 | C | 0.62 | 67 |
| Comp. Ex. 9 | 74 | 7 | 10 | 8 | C | 0.41 | 49 |

EXAMPLES 22 and 23

Comparative Examples 10 and 11

Biaxially oriented films were obtained in the same manner as in Example 1 except that the particle diameter of fine particles (C) was changed as shown in Table 6. The properties of the thus obtained films are shown in Table 6. As is evident from Table 6, the films of the present invention have excellent blocking resistance and transparency.

EXAMPLES 24 and 25

Comparative Examples 12 and 13

Biaxially oriented films were obtained in the same manner as in Example 1 except that the proportions of copolyester (A), poly(alkylene oxide) (B) and fine particles (C) were changed as shown in Table 7. The properties of the thus obtained films are shown in Table 7. As is evident from Table 7, the films of the present invention have excellent transparency and traveling properties.

TABLE 7

|  | copolyester (A) (WT %) | poly(alkylene oxide) (B) (WT %) | fine particles (C) (WT %) | proportion of (A) based on the total of (A), (B) and (C) (WT %) | transparency (%) | friction coefficient | surface energy (dyne/cm) |
|---|---|---|---|---|---|---|---|
| Example 24 | 72 | 16 | 3 | 3.3 | 91 | 0.48 | 58 |
| Example 25 | 55 | 16 | 20 | 22 | 86 | 0.40 | 54 |
| Comp. Ex. 12 | 73 | 16 | 2 | 2.2 | 91 | 0.64 | 59 |
| Comp. Ex. 13 | 48 | 16 | 27 | 30 | 77 | 0.40 | 51 |

The polyester films of the above examples of the present invention have excellent adhesion between the ink-receiving layer and the base film, excellent transparency and traveling property, and is useful as an OHP film.

EXAMPLE 26

A biaxially oriented film was obtained in the same manner as in Example 1 except that monoaxially oriented film prepared by melt extruding a composition comprising (i) 90% by weight of a polyester (intrinsic viscosity: 0.62) which consists of a terephthalic acid component and an ethylene glycol component and (ii) 10% by weight of titanium dioxide over a rotary cooling drum maintained at a temperature of 20° C. to form an unoriented film and drawing the unoriented film to 3.6 times in the longitudinal direction was used in place of the monoaxially oriented film of polyethylene terephthalate having an intrinsic viscosity of 0.64 of Example 1. The properties of the thus obtained film are shown in Table 8. Ra of the coating was 120 nm and the surface energy was 60 dyne/cm. The light transmission rate of the polyester base film was 3%. The thermal shrinkage of the thus obtained biaxially oriented laminated film was 0.9% in the longitudinal direction of the film and 0.2% in the transverse direction.

Comparative Example 14

A biaxially oriented film was obtained in the same manner as in Example 26 except that an aqueous solution was not applied. The properties of the film are shown in Table 8.

EXAMPLES 27 to 33

Biaxially oriented films were obtained in the same manner as in Example 26 except that type and proportion of the coating was changed as shown in Table 8. The properties of the film are shown in Table 8.

changed as shown in Table 9 and copolyesters having different Tgs were used. The properties of the film are shown in Table 9. As is evident from Table 9, the films of the present invention have excellent blocking resistance and adhesion property.

TABLE 9

|  | type of (A) (note 3) | Tg of (A) (° C.) | blocking resistance | adhesion | surface energy (dyne/cm) |
|---|---|---|---|---|---|
| Example 33 | G | 25 | fair | A | 61 |
| Example 34 | H | 50 | good | A | 60 |
| Example 35 | I | 65 | good | A | 57 |
| Example 36 | J | 79 | good | B | 56 |
| Comp. Ex. 15 | K | 15 | poor | A | 62 |
| Comp. Ex. 16 | L | 97 | good | C | 58 |

(Note 3) Abbreviations in (A) and (8) in the table denote the same as in Table 2.

EXAMPLES 37 to 41

Comparative Examples 17 and 18

Biaxially oriented films were obtained in the same manner as in Example 26 except that the proportion of the dicarboxylic acid component containing a sulfonate group of copolyester (A) was changed as shown in Table 10. The properties of the film are shown in Table 10. As is evident from Table 10, the coating used in the present invention has excellent water dispersibility and the films of the present invention have excellent moisture resistance.

TABLE 8

|  | (A) type (note 1) and proportion of copolyester (WT %) | (B) type (note 2) and proportion of poly(alkylene oxide) (WT %) | (C) proportion of fine particles (WT %) | adhesion | surface energy (dyne/cm) | light transmission rate (%) |
|---|---|---|---|---|---|---|
| Example 26 | E 65 | P 16 | 10 | A | 60 | 3 |
| Example 27 | E 70 | P 11 | 10 | A | 58 | 4 |
| Example 28 | E 65 | Q 16 | 10 | A | 57 | 3 |
| Example 29 | E 70 | Q 11 | 10 | A | 55 | 3 |
| Example 30 | F 65 | P 16 | 10 | A | 60 | 4 |
| Example 31 | F 70 | P 11 | 10 | A | 57 | 3 |
| Example 32 | F 60 | P 21 | 10 | A | 64 | 3 |
| Comp. Ex. 14 | — | — | — | C | 47 | 3 |

(Note 1) (Note 2) Abbreviations in (A) and (B) in the table denote the same as in Table 1.

EXAMPLES 33 to 36

Comparative Examples 15 and 16

Biaxially oriented films were obtained in the same manner as in Example 26 except that type of copolyester (A) was

TABLE 10

| | proportion of carboxylic acid component of copolyester (A) (mol %) | | | water dispersibility | moisture resistance | surface energy (dyne/cm) |
|---|---|---|---|---|---|---|
| | 5-Na sulfoisophthalic acid | terephthalic acid | isophthalic acid | | | |
| Example 37 | 1 | 60 | 39 | fair | good | 58 |
| Example 38 | 1.5 | 60 | 38.5 | good | good | 59 |
| Example 39 | 8 | 60 | 32 | good | good | 62 |
| Example 40 | 14 | 60 | 26 | good | good | 65 |
| Example 41 | 16 | 60 | 24 | good | fair | 67 |
| Comp. Ex. 17 | 0 | 60 | 40 | poor | good | 57 |
| Comp. Ex. 18 | 20 | 60 | 20 | good | poor | 70 |

EXAMPLES 42 to 44

Comparative Examples 19 and 20

Biaxially oriented films were obtained in the same manner as in Example 26 except that the proportions of copolyester (A), poly(alkylene oxide) (B) and fine particles (C) were changed as shown in Table 11. The properties of the film are shown in Table 11. As is evident from Table 11, the films of the present invention have excellent adhesion and traveling properties.

EXAMPLES 47 and 48

Comparative Examples 23 and 24

Biaxially oriented films were obtained in the same manner as in Example 26 except that the particle diameter of fine particles (C) was changed as shown in Table 13. The properties of the film are shown in Table 13. As is evident from Table 13, the films of the present invention have excellent blocking resistance.

TABLE 11

| | copolyester (A) (WT %) | poly(alkylene oxide) (B) (WT %) | fine particles (C) (WT %) | proportion of (A) based on the total of (A), (B) and (C) (WT %) | adhesion | friction coefficient | surface energy (dyne/cm) |
|---|---|---|---|---|---|---|---|
| Example 42 | 60 | 21 | 10 | 66 | A | 0.33 | 62 |
| Example 43 | 55 | 26 | 10 | 60 | A | 0.31 | 64 |
| Example 44 | 70 | 11 | 10 | 77 | A | 0.39 | 57 |
| Comp. Ex. 19 | 40 | 41 | 10 | 44 | B | 0.68 | 70 |
| Comp. Ex. 20 | 79 | 2 | 10 | 87 | C | 0.32 | 50 |

EXAMPLES 45 and 46

Comparative Examples 21 and 22

Biaxially oriented films were obtained in the same manner as in Example 26 except that the proportions of copolyester (A), poly(alkylene oxide) (B) and fine particles (C) were changed as shown in Table 12. The properties of the film are shown in Table 12. As is evident from Table 12, the films of the present invention have excellent adhesion and traveling properties.

TABLE 13

| | average particle diameter of fine particles (C) (nm) | blocking resistance | surface energy (dyne/cm) |
|---|---|---|---|
| Example 47 | 20 | fair | 61 |
| Example 48 | 80 | good | 60 |
| Comp. Ex. 23 | 10 | poor | 62 |
| Comp. Ex. 24 | 120 | good | 62 |

TABLE 12

| | copolyester (A) (WT %) | poly(alkylene oxide) (B) (WT %) | fine particles (C) (WT %) | proportion of (A) based on the total of (A), (B) and (C) (WT %) | adhesion | friction coefficient | surface energy (dyne/cm) |
|---|---|---|---|---|---|---|---|
| Example 45 | 71 | 10 | 10 | 11 | A | 0.39 | 56 |
| Example 46 | 51 | 30 | 10 | 33 | A | 0.32 | 62 |
| Comp. Ex. 21 | 31 | 50 | 10 | 55 | C | 0.62 | 70 |
| Comp. Ex. 22 | 74 | 7 | 10 | 8 | C | 0.31 | 51 |

EXAMPLES 49 and 50

Comparative Examples 25 and 26

Biaxially oriented films were obtained in the same manner as in Example 26 except that the proportions of copolyester (A), poly(alkylene oxide) (B) and fine particles (C) were changed as shown in Table 14. The properties of the film are shown in Table 14. As is evident from Table 14, the films of the present invention have excellent adhesion and traveling properties.

TABLE 14

|  | copolyester (A) (WT %) | poly(alkylene oxide) (B) (WT %) | fine particles (C) (WT %) | proportion of (C) based on the total of (A), (B) and (C) | friction coefficient | surface energy (dyne/cm) |
| --- | --- | --- | --- | --- | --- | --- |
| Example 49 | 72 | 16 | 3 | 3.3 | 0.38 | 61 |
| Example 50 | 55 | 16 | 20 | 22 | 0.30 | 57 |
| Comp. Ex. 25 | 73 | 16 | 2 | 2.2 | 0.64 | 61 |
| Comp. Ex. 26 | 48 | 16 | 27 | 30 | 0.30 | 53 |

What is claimed is:

1. A laminated film comprising:

(A) an aromatic polyester film; and (B) a hydrophilic coating layer which is present on at least one side of the aromatic polyester film (A) and has a surface energy of at least 54 dyne/cm, the coating layer comprising:

(a) 50 to 80% by weight, based on the total of components (a), (b) and (c), of a copolyester which contains a dicarboxylic acid component having a sulfonate group in an amount of 1 to 16 mol % of the total of all dicarboxylic acid components and has a secondary transition point of 20 to 90° C., (b) 10 to 30% by weight, based on the total of components (a), (b) and (c), of poly (alkylene oxide) homopolymer having a number average molecular weight of 600 to 2,000, and (c) 3 to 25% by weight, based on the total of components (a), (b) and (c), of fine particles having an average particle diameter of 20 to 80 nm;

wherein the composition comprising:

(a) 50% to 80% by weight, based on the total of components (a), (b) and (c), of a copolyester which contains a dicarboxylic acid component having a sulfonate group in an amount of 1 to 16 mol % of the total of all dicarboxylic acid components and has a secondary transition point of 20 to 90° C., (b) 10 to 30% by weight, based on the total of components (a), (b) and (c), or poly (alkylene oxide) homopolymer having a number average molecular weight of 600 to 2,000, and (c) 3 to 25% by weight, based on the total of components (a), (b) and (c), of fine particles having an average particle diameter of 20 to 80 nm, and produced by a process comprising admixing said components (a), (b) and (c), has a surface energy of at least 54 dyne/cm.

2. The laminated film of claim 1, wherein the dicarboxylic acid component having a sulfonate group contained in the copolyester (a) of the hydrophilic coating layer is an alkali metal salt of 5-sulfoisophthalic acid.

3. The laminated film of claim 2, wherein the alkali metal salt of 5-sulfoisophthalic acid is a lithium salt, sodium salt or potassium salt.

4. The laminated film of claim 1, wherein the proportion of the dicarboxylic acid component having a sulfonate group is 1.5 to 14 mol % of the total of all dicarboxylic acid components.

5. The laminated film of claim 1, wherein the poly (alkylene oxide) (b) of the hydrophilic coating layer is poly(ethylene oxide).

6. The laminated film of claim 1, wherein the fine particles (c) contained in the hydrophilic coating layer are crosslinked organic polymer fine particles.

7. The laminated film of claim 1, wherein the hydrophilic coating layer has a surface energy of at least 60 dyne/cm.

8. The laminated film of claim 1, wherein the aromatic polyester film (A) is a biaxially oriented film which exhibits a thermal shrinkage of 1% or less when it is heated at 150° C. for 30 minutes.

9. The laminated film of claim 8, wherein the aromatic polyester film (A) is a polyethylene terephthalate or polyethylene-2,6-naphthalene dicarboxylate film.

10. The laminated film of claim 1, wherein the aromatic polyester film (A) has a light transmission rate of at least 85% and a haze value of 10% or less.

11. The laminated film of claim 10, wherein the aromatic polyester film (A) has a center line average surface roughness Ra of 5 to 15 nm.

12. The laminated film of claim 1, wherein the aromatic polyester film (A) has a light transmission rate of at least 85% and a haze value of 10% or less, and an aqueous ink-receiving layer is further formed on the hydrophilic coating layer.

13. The laminated film of claim 12 which is a transparency for an overhead projector.

14. The laminated film of claim 1, wherein the aromatic polyester film (A) has a light transmission rate of 20% or less and is white.

15. The laminated film of claim 1, wherein the aromatic polyester film (A) has a center line average surface roughness Ra of 100 to 250 nm.

16. The laminated film of claim 1, wherein the aromatic polyester film (A) has a light transmission rate of 20% or less and is white, and an aqueous ink-receiving layer is further formed on the hydrophilic coating layer.

17. The laminated film of claim 16 which is recording paper for an ink jet printer.

\* \* \* \* \*